F. H. SPEER.
EGG BEATER.
APPLICATION FILED FEB. 3, 1909.
926,362.
Patented June 29, 1909.
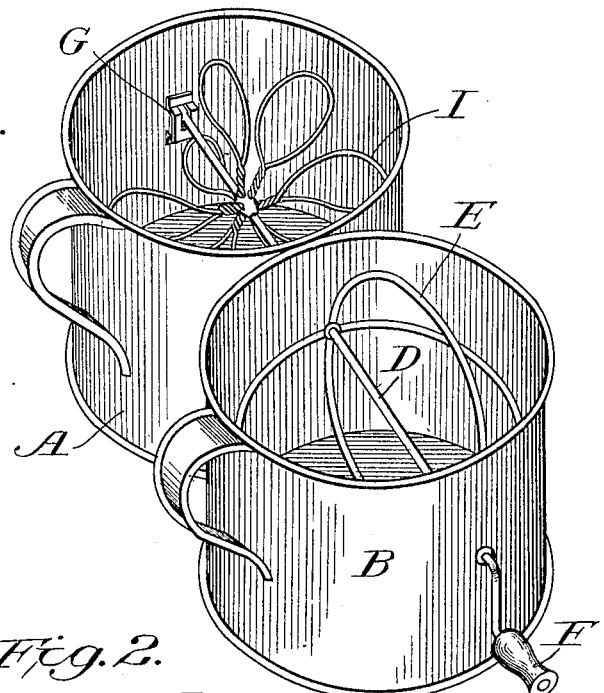
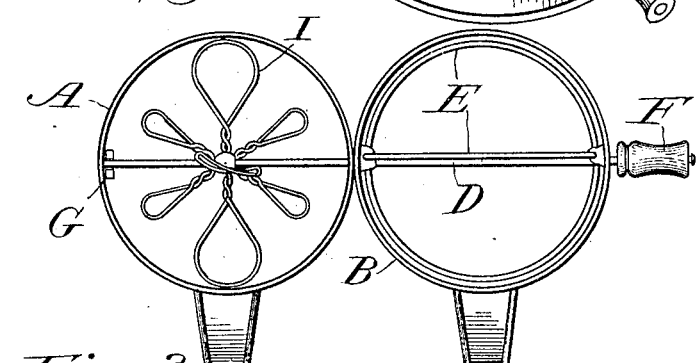
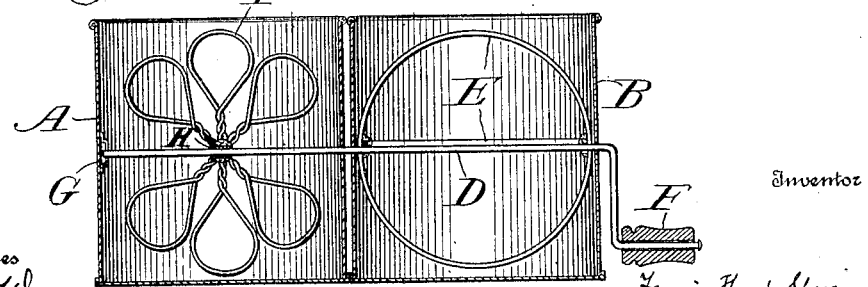

UNITED STATES PATENT OFFICE.

FANNIE HOYT SPEER, OF CORNELIA, GEORGIA.

EGG-BEATER.

No. 926,362.  Specification of Letters Patent.  Patented June 29, 1909.

Application filed February 3, 1909. Serial No. 475,784.

*To all whom it may concern:*

Be it known that I, FANNIE HOYT SPEER, a citizen of the United States, residing at Cornelia, in the county of Habersham and State of Georgia, have invented certain new and useful Improvements in Egg-Beaters, of which the following is a specification.

My invention relates to a device for beating eggs, and has for its particular object to provide a machine by which the yolks and whites can be beaten separately, but at the same time. This object I attain by the mechanism shown in the accompanying drawings, in which—

Figure 1 is a perspective view; Fig. 2, a plan view; and Fig. 3, a sectional elevation.

As shown in the drawings, A and B, are two cups or receptacles, and arranged within these cups are beaters, mounted on a shaft, D, which passes through openings in the walls of the cup B, and through a registering opening in the wall of the cup A, the end of this shaft being mounted in a slotted socket G. Permanently secured on this shaft D are two circular wire hoops E at right angles to each other. Wire paddles or loops I are soldered to the sleeve H, which is in turn detachably secured, as by a sufficiently tight frictional joint, or by any suitable fastening device, to the shaft D.

In use the yolks and whites of the eggs are each put into one of the receptacles, and can be simultaneously beaten by rotating the handle F.

When it is desired to clean the utensil, the shaft D is pulled out of the sleeve H of the beater I, thus leaving this beater free from the shaft and cup A, the beater E, remaining in place in the cup B. All the parts can now be easily cleaned.

What I claim is:

An egg-beater comprising two receptacles, a shaft passing through both receptacles, a beater permanently secured to the shaft within one cup, a second beater detachably secured to the shaft within the other cup, and means for operating the shaft.

In testimony whereof, I affix my signature in presence of two witnesses.

FANNIE HOYT SPEER.

Witnesses:
LEE HOOPER,
S. P. SMITH.